US007454753B2

(12) United States Patent
Davis et al.

(10) Patent No.: US 7,454,753 B2
(45) Date of Patent: Nov. 18, 2008

(54) SEMAPHORE MANAGEMENT SUBSYSTEM FOR USE WITH MULTI-THREAD PROCESSOR SYSTEMS

(75) Inventors: Gordon Taylor Davis, Chapel Hill, NC (US); Marco Heddes, Lawrence, MA (US); Steven Kenneth Jenkins, Raleigh, NC (US); Ross Boyd Leavens, Cary, NC (US); Robert Brian Likovich, Jr., Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1078 days.

(21) Appl. No.: 10/179,860

(22) Filed: Jun. 25, 2002

(65) Prior Publication Data

US 2003/0005195 A1    Jan. 2, 2003

Related U.S. Application Data

(60) Provisional application No. 60/301,602, filed on Jun. 27, 2001.

(51) Int. Cl.
G06F 9/46     (2006.01)
G06F 12/00    (2006.01)
G06F 12/14    (2006.01)
G06F 13/00    (2006.01)
G06F 13/28    (2006.01)

(52) U.S. Cl. .................... 718/104; 710/200; 711/152

(58) Field of Classification Search ............ 718/100, 718/104; 710/200; 711/147, 152, 163; 726/1, 726/2, 26–27
See application file for complete search history.

(56) References Cited

U.S. PATENT DOCUMENTS 4,805,106 A    2/1989   Pfeifer ................. 364/200
4,907,228 A    3/1990   Bruckert et al. ........ 371/68.3

(Continued)

FOREIGN PATENT DOCUMENTS

EP              0953903 A2       11/1999

(Continued)

OTHER PUBLICATIONS

IBM Technical Disclosure Bulletin vol. 30, No. 3, Aug. 1987, p. 1203, "Non-Atomic (Ordered) Semaphore Operations".

(Continued)

*Primary Examiner*—Thomas Lee
*Assistant Examiner*—Qing-Yuan Wu
(74) *Attorney, Agent, or Firm*—Joscelyn G. Cockburn (57) ABSTRACT

A generic method and apparatus for managing semaphores in a multi-threaded processing system has a storage area for each of the threads in the processing system. Each storage area includes a first part for storing at least one indicia for identifying at least one unique semaphore from a plurality of semaphores utilized by the multi-threaded processing system and a second part for storing an indicia for indicating a locked status for the stored semaphore. A thread requiring a semaphore sends a semaphore lock request to the semaphore manager which examines the contents of all of the storage areas to determine the status of the requested semaphore. If the requested semaphore is not locked, it is locked for the requesting thread by inserting the requested semaphore and locked status in the memory location assigned to the requesting thread.

14 Claims, 6 Drawing Sheets

U.S. PATENT DOCUMENTS

| | | | |
|---|---|---|---|
| 5,142,632 A | 8/1992 | Tychon et al. | 395/375 |
| 5,159,686 A | 10/1992 | Chastain et al. | 395/650 |
| 5,233,701 A | 8/1993 | Nakata | 395/425 |
| 5,261,106 A | 11/1993 | Lentz et al. | 395/725 |
| 5,276,886 A | 1/1994 | Dror | 395/725 |
| 5,339,443 A | 8/1994 | Lockwood | 395/725 |
| 5,485,593 A | 1/1996 | Baker | 395/200.08 |
| 5,548,780 A | 8/1996 | Krein | 395/825 |
| 5,613,139 A | 3/1997 | Brady | 395/800 |
| 5,664,092 A | 9/1997 | Waites | 395/183.01 |
| 5,675,829 A | 10/1997 | Oskouy et al. | 395/826 |
| 5,696,939 A | 12/1997 | Iacobovici et al. | 395/477 |
| 5,734,909 A | 3/1998 | Bennett | 395/726 |
| 5,842,018 A | 11/1998 | Atkinson et al. | 395/700 |
| 5,852,731 A | 12/1998 | Wang et al. | 395/670 |
| 5,862,180 A | 1/1999 | Heinz | 375/244 |
| 5,864,653 A | 1/1999 | Tavallaci et al. | 315/181 |
| 5,893,157 A | 4/1999 | Greenspan et al. | 711/150 |
| 5,901,308 A | 5/1999 | Cohn et al. | 395/591 |
| 6,018,785 A | 1/2000 | Wenniger | 710/200 |
| 6,026,427 A | 2/2000 | Nishihara et al. | 709/106 |
| 6,029,190 A | 2/2000 | Oliver | 709/107 |
| 6,070,254 A | 5/2000 | Pratt et al. | 714/43 |
| 6,079,013 A | 6/2000 | Webb et al. | 712/227 |
| 6,105,085 A | 8/2000 | Farley | 710/41 |
| 6,119,246 A | 9/2000 | McLaughlin et al. | 714/27 |
| 6,122,713 A | 9/2000 | Huang et al. | 711/147 |
| 6,125,401 A | 9/2000 | Huras et al. | 709/300 |
| 6,128,706 A | 10/2000 | Bryg et al. | 711/141 |
| 6,131,094 A | 10/2000 | Gord | 707/8 |
| 6,134,579 A | 10/2000 | Tavallaei et al. | 709/100 |
| 6,134,619 A | 10/2000 | Futral et al. | 710/112 |
| 6,154,847 A | 11/2000 | Schofield et al. | 714/4 |
| 6,161,169 A | 12/2000 | Cheng | 711/150 |
| 6,173,313 B1 | 1/2001 | Klots et al. | 709/203 |
| 6,182,108 B1 | 1/2001 | Williams et al. | 709/102 |
| 6,199,094 B1 | 3/2001 | Presler-Marshall | 709/104 |
| 2002/0138544 A1* | 9/2002 | Long | 709/107 |

FOREIGN PATENT DOCUMENTS

| | | |
|---|---|---|
| EP | 1033654 A1 | 9/2000 |
| JP | 4361340 | 12/1992 |
| JP | 8329019 | 12/1996 |
| JP | 9044376 | 2/1997 |
| JP | 9231123 | 2/1999 |
| JP | 11039176 | 2/1999 |
| JP | 11272480 | 10/1999 |
| JP | 2001005694 | 1/2001 |
| JP | 2001022720 | 1/2001 |
| WO | WO9603697 | 2/1996 |

OTHER PUBLICATIONS

Research Disclosure, Aug. 2000, p. 1442, article 436131, "User lever writing to a pinned kernel buffer in an SMP system".

IBM Technical Disclosure Bulletin vol. 37, No. 12, Dec. 1994, "Error Handler Installation Procedure", pp. 239-240.

IBM Technical Disclosure Bulletin vol. 37, No. 06A, Jun. 1994, "Shared Memory Cluster—A Scalable Multiprocessor Design", pp. 503-507.

IBM Technical Disclosure Bulletin vol. 30, No. 5, Oct. 1987, "Fast Method for Simultaneous Exclusive Table Modifications", pp. 348-350.

IBM Technical Disclosure Bulletin vol. 38 No. 4, Apr. 1995, "Hardware Contention Serialization Algorithm", pp. 73-77.

IBM Technical Disclosure Bulletin vol. 33, No. 4, Sep. 1990, "Store Purge Pipeline for Mid-Range Processor", pp. 299-301.

IBM Technical Disclosure Bulletin vol. 36, No. 6A, Jun. 1993, "Emulator DosExit Processing for Reporting Errors", pp. 255-256.

Research Disclosure No. 317, Sep. 1990, "Improved Error Detection Using MP Fields".

IBM Technical Disclosure Bulletin No. 9. Feb. 1991, "System Support for Multiprocessing Without an Atomic Storage", pp. 18-23.

E. Chang, "N-Philosophers: an Exercise in Distributed Control", Computer Networks vol. 4, No. 2,, Apr. 1980, pp. 71-76.

P. Bohannon et al., "Recoverable User-Level Mutual Exclusion", Proceedings, 7th IEEE Symposium on Parallel and Distributed Processing (Cat. No. 95TB8131), 1995, pp. 293-301.

J. Thornley et al., "Monotonic counters: a New Mechanism for Thread Syncrhonization", Proceedings 14th International Parallel and Distributed Processing Symposium, IPDPS 2000, pp. 573-582.

K. C. Tai et al., "VP: A New Operation for Semaphores", Operating Systems Review, vol. 30, No. 3, Jul. 1996, pp. 5-11.

Mei Chen Chia et al., "A Resource Synchronization Protocol for Multiprocessor Real-Time Systems", Proceedings of the 1994 International Conference on Parallel Processing, Pt. vol. 3, 1994, pp. 159-162.

Heng Liao et al., "Hardware Support for Process Synchronization Algorithms", Mini-Micro Systems, vol. 16, No. 9, Sep. 1995, pp. 7-13.

Chung Wu Chaio et al., "The Design and Implementation of a Distributed Semaphore Facility: DISEM", Proceedings of the National Science Council, Republic of China, Part A, vol. 19, No. 4, Jul. 1995, pp. 319-320.

D. Scholefield, "Proving Properties of Real-Time Semaphores", Science of Computer Programming, vol. 24, No. 2, Apr. 1995, pp. 159-181.

D. Weiss, "Shared Bus Semaphore Detector Proposal", Motorola Technical Developments, vol. 3, Mar. 1983, pp. 74-78.

J. Milde et al., "Realization of Synchronization Tools and their Efficiency in the Multiprocessor System M5PS", 10th IMACS World Congress on System Simulation and Scientific Computation, vol. 1, 1982, pp. 333-335.

N. Wait, "VME—a Microcomputer Bus for Europe", New Electronics vol. 15, No. 16,Aug. 17, 1992, pp. 57-58.

N. Marovac, "Interprocess Syncrhonization and Communication in Distributed Architectures", 3rd Interna-Tional Conf. On Computer Science) Chile, 1983 pp. 1-16.

N. Marovac, "On Interprocess Interaction in Distributed Architectures", Computer Architecture News vol. 11, No. 4, Sep. 1983, pp. 17-22.

T. Balph, "Interprocessor Communication in a Tightly coupled Multiple Processor Architecture", Second Annual Phoenix Conference on Computers and Communications, 1983 Conf. Proceedings pp. 21-25.

* cited by examiner

SEMAPHORE MANAGEMENT SUBSYSTEM FOR USE WITH MULTI-THREAD PROCESSOR SYSTEMS

This application claims the benefit of the filing date of provisional application Ser. No. 60/301,602, filed Jun. 27, 2001.

FIELD OF THE INVENTION

The invention is directed to a generic semaphore management method and subsystem which is adapted for use with a plurality of different multi-threaded processor systems.

BACKGROUND

While the invention is generic in nature and capable of use with a large variety of multi-threaded processor systems, it will be described in conjunction with a multi-threaded processor system such as the IBM Part No. IBM32NPR161EPXCAE133 Network Processor which employs a plurality of processors each of which concurrently process data frames. The individual threads/processors share common resources in the network processor. Semaphores defined to be associated with specific resources are used to allocate the specific resources to the individual threads as requested.

Within such a network processor several data frames are processed at the same time. Each frame is processed by one processor/thread. Each processor/thread operates independently from all the other processors/threads. Thus, as the software (picocode) processes a data frame, the software has no knowledge of other frames which have been, are being, or will be processed. As frames are processed, a thread may need access to a shared resource. This shared resource is shared among all threads. To allow a thread access to the resource without interference from other threads, semaphores are used. A semaphore is a mechanism which allows a processor/thread to use a resource without interference from another processor/thread. Semaphores exist in almost every multi-processor environment where multiple processors can access common resources. A semaphore is used to ensure that one and only one processor/thread has "ownership" or use of a given resource at any given time.

A network processor is a multi-processor environment with resources which can be accessed by all processors/threads. Thus, semaphores are an intricate part of network processors. As discussed above, network processors process frames which belong to one or more flows. Traditionally, semaphores are implemented in software using "read modify write" or "test and set" instructions. When these instructions are used as a basis to create and allocate semaphores, valuable system resources must be used. To implement a semaphore, system memory must be used. To access a semaphore, several lines of code must be executed. If these system resources were not used for semaphore implementation, they could be used for other functions or provide a performance increase by not executing extra line(s) of code.

When semaphores are implemented in software, several lines of code must be executed to access and lock the semaphore, thus impacting performance. If the semaphore is unavailable (locked by another thread/processor), the software would need to poll on the semaphore. This would waste valuable bandwidth on the arbitrated memory holding semaphore locks to be accessed by all threads/processors. To implement a fair semaphore access in software requires more system memory and lines of code. For example, if a semaphore is locked, the thread/processor would need to put itself in a queue waiting for access. This queue would be implemented in system memory and require software management, impacting performance. This allows threads/processors to have fair access to resources.

In a software semaphore environment, multiple threads/processors cannot unlock their respective semaphores at the same time. Typically, all the semaphores are in the same system memory. Each thread/processor must arbitrate to access the memory to unlock their semaphore. This may add to the processing time of other threads/processors waiting to access the same memory to access the semaphore locks. The same is true for locking semaphores. When semaphores are implemented in software, only one semaphore can be unlocked/locked at a time since all the semaphores reside in a common area of system memory.

SUMMARY OF THE INVENTION

The invention contemplates a generic method and apparatus for managing semaphores in a multi-threaded processing system. The invention uses a non-system memory which has a storage area for each of the threads in the processing system. Each storage area includes a first part for storing at least one indicia for identifying at least one unique semaphore from a plurality of semaphores utilized by the multi-threaded processing system and a second part for storing an indicia for indicating a locked status for the stored semaphore. A thread requiring a semaphore sends a semaphore lock request to the semaphore manager which examines the contents of all of the storage areas to determine if a locked semaphore corresponding to the requested semaphore is stored in any of the storage areas.

If a locked semaphore corresponding to the requested semaphore is not found the semaphore manager stores the requested semaphore in the storage area associated with the requesting thread along with a locked status indicia and notifies the requesting thread that the request is granted. The request is rejected if the same locked semaphore is found in the memory and is locked by the requesting thread. The request is held in abeyance if the same locked semaphore is found in the memory but is not locked by the requesting thread and the request does not include a time out enable bit which is set to one.

When a thread issues an unlock signal the semaphore manager unlocks the semaphore associated with the thread sending the unlock signal. In response to an exit signal from a thread the semaphore manager examines the storage location associated with the thread providing the exit signal to determine if the semaphore is unlocked and unlocks the semaphore if it is locked and generates a semaphore locked exit error message for return to the associated thread.

DETAILED DESCRIPTION OF THE INVENTION

Figure 1:
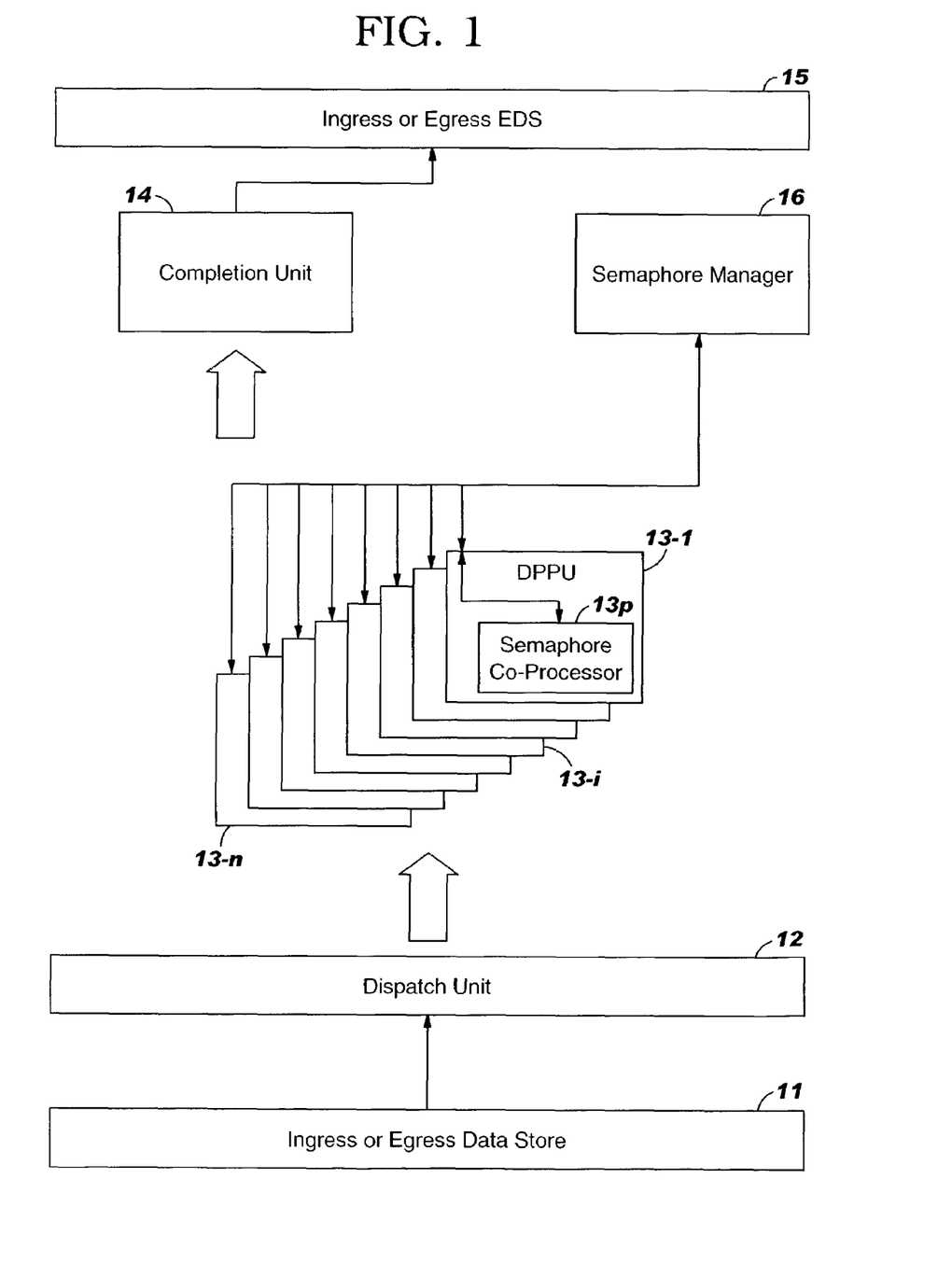
FIG. 1 is a block diagram of a network processor including a novel generic semaphore management subsystem according to the invention.

In FIG. 1 a network processor such as the IBM processor identified above includes an input/output data storage unit 11 which stores a plurality or stream of data frames which require processing. A dispatching unit 12 transfers individual data frames to a plurality of processors 13-1-13-$n$ which process the individual frames received from the dispatching unit 12. The processors 13-1-13-$n$ pass the processed data frames on to a completion unit 14 which reassembles the data frames before passing the reassembled stream of data frames on to a second input/output unit 15.

Each of the processors 13-1-13-$n$ includes a semaphore coprocessor 13$p$ which interfaces a hardware semaphore manager subsystem 16 constructed according to the invention. The semaphore subsystem 16 is implemented in hardware and interfaces with, for example, the Dyadic Protocol Processor Unit (DPPU) of the using processing system. Each DPPU contains four threads which can each process one data frame. Each DPPU has one Semaphore Co-Processor associated with it. The threads in a given DPPU interface to the one Semaphore Co-Processor within the DPPU. The multiple Semaphore Co-Processors all communicate with the central Semaphore Manager subsystem. The Semaphore Manager subsystem 16 contains all of the tables, and control logic to lock, unlock, and arbitrate for semaphores.

Only one processor instruction is executed to lock a semaphore, and only one processor instruction is executed to unlock a semaphore. This saves instruction memory and processing time when compared to software implementations of semaphores. An unlock instruction from a thread executes immediately. Nothing can block unlock instructions within the Semaphore Manager subsystem, including other unlock instructions from other threads. When semaphores are implemented in software, only one semaphore can be unlocked at a time since all the semaphores reside in a common area of system memory.

Fairness algorithms can be implemented in the Hardware Semaphore Manager subsystem. This provides fairness of access to a semaphore when multiple threads/processors are making simultaneous requests. This eliminates the need for software and system memory to be utilized to implement fairness algorithms. This increases performance by reducing frame processing time and instruction memory utilization, and does not use any system memory.

The Hardware Semaphore Manager subsystem contains the semaphores. Each semaphore is an N bit value. For example, each semaphore could be 32 bits. This allow $2^{32}$ resources to be managed by the Semaphore Manager. Since the Semaphore Manager subsystem is generic and designed to be used by a wide variety of systems, it is the responsibility of the using system programmer to attach a meaning to a semaphore. That is, the Semaphore Manager does not know what a Semaphore represents. It is just a string of 32 bits. Semaphores can be seen as having 32-bit address space and the programmer can map this to anything, like the Tree Search Memory, the Data Store, the Embedded PowerPC, etc. There are two advantages here. First, no system memory is used for semaphore management. Second, the Hardware Semaphore Manager implementation is generic with respect to the number of and types of system resources which must be managed by semaphores. As the Network Processor evolves and shared resources are added or removed, the Semaphore Manager does not need to change. The Hardware Semaphore Co-processor and Manager does not use any system memory. This eliminates the need for memory accesses, and allows the memory bandwidth to be used for other functions.

Figure 2:
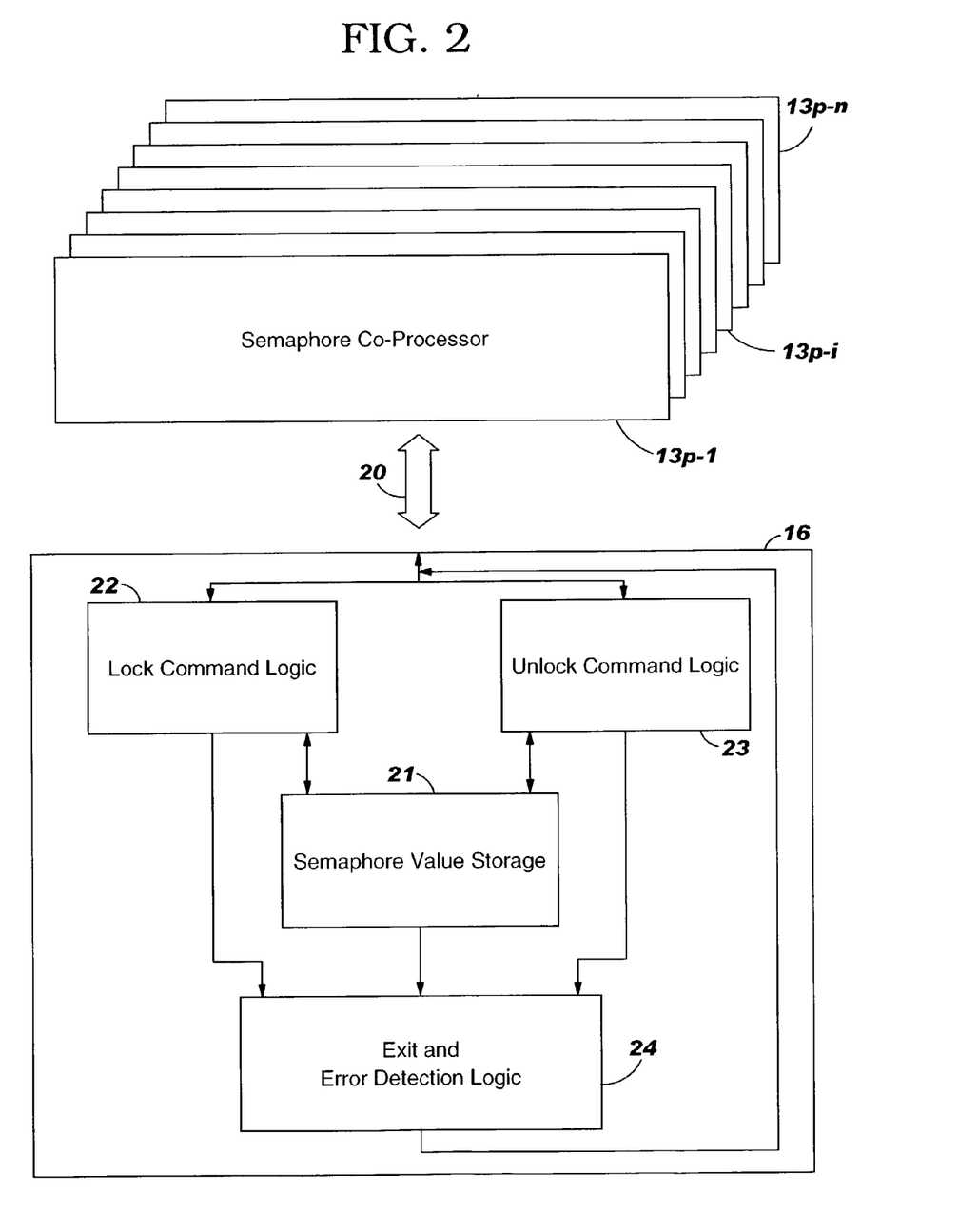
FIG. 2 is a block diagram of the generic semaphore subsystem of FIG. 1.

In FIG. 2 the semaphore coprocessors 13$p$-$l$-13$p$-$n$ communicate with the Semaphore Manager subsystem 16 via a bus 20. The subsystem 16 includes a semaphore value storage 21 (FIG. 3), semaphore lock command logic 22 (FIG. 4), semaphore unlock command logic 23 (FIG. 5) and semaphore exit and error detection logic 24 (FIG. 6).

Figure 3:
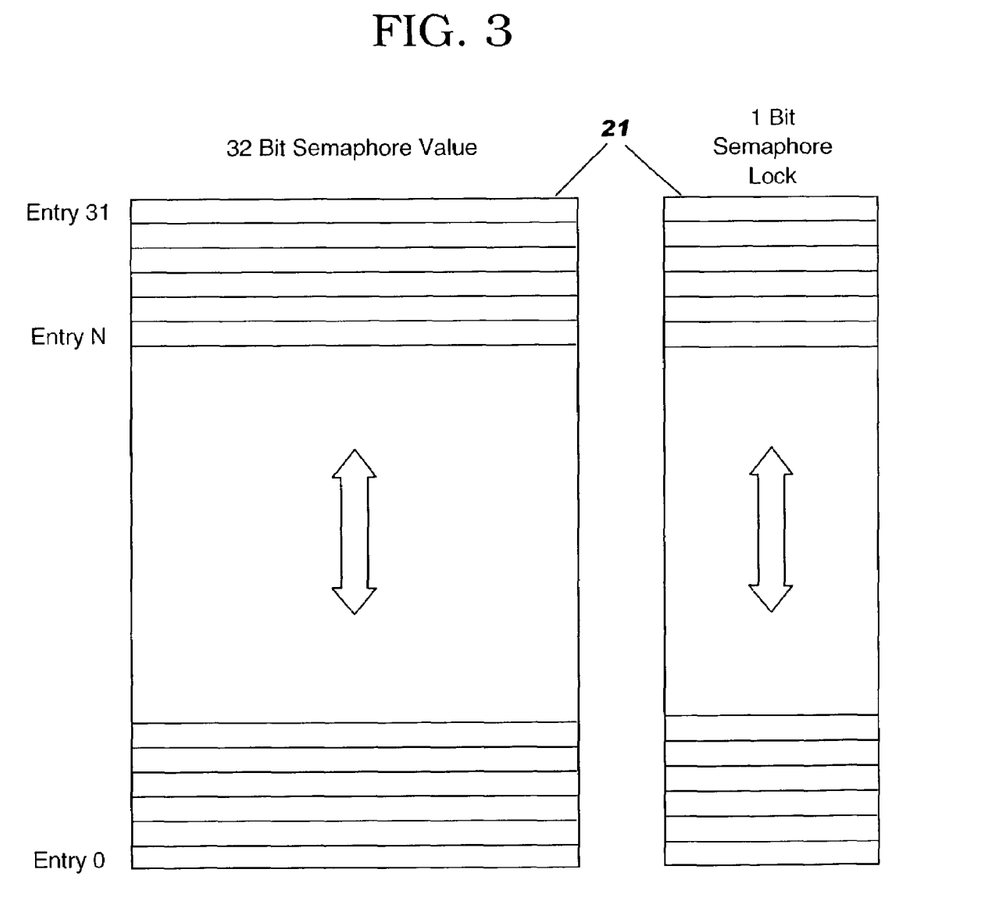
FIG. 3 is a detailed diagram of the semaphore value storage illustrated in FIG. 2.

FIG. 3 is a block diagram of the semaphore value storage. The storage can be based upon a RAM, CAM, or discrete latches. For each thread there exists exactly two registers. The first register (Semaphore_Value) is for example a 32 bit register which holds the 32 bit Semaphore Value (Sem_Val) that can be locked by the associated thread. The second register (Semaphore_Lock) is a 1 bit register which indicates if the Sem_Val stored in the associated Semaphore_Value register is locked or unlocked. When the Semaphore_Lock register is set to 1'b, the Sem_Val in the Semaphore_Value register is locked. When the Semaphore_Lock register is reset to '0'b, no Sem_Val is locked by the associated software thread.

A semaphore can be locked when a software thread issues a single command "Semaphore Lock" (Sem_Lock) with two parameters. The first parameter is the "Semaphore Value" (Sem_Val). This is, for example, a 32 bit value which the thread wishes to lock. The second parameter is the "Timeout Enable" (Timeout_Enable) bit. When the Timeout Enable bit is set and the requested semaphore is already locked by a different thread, the Semaphore Lock command will terminate without locking the semaphore.

In the preferred embodiment, each thread has an assigned register in the semaphore value storage and is thus identified as the source of the semaphore value requested. Alternatively, the requested semaphore value could be placed in any available register along with the thread ID.

Figure 4:
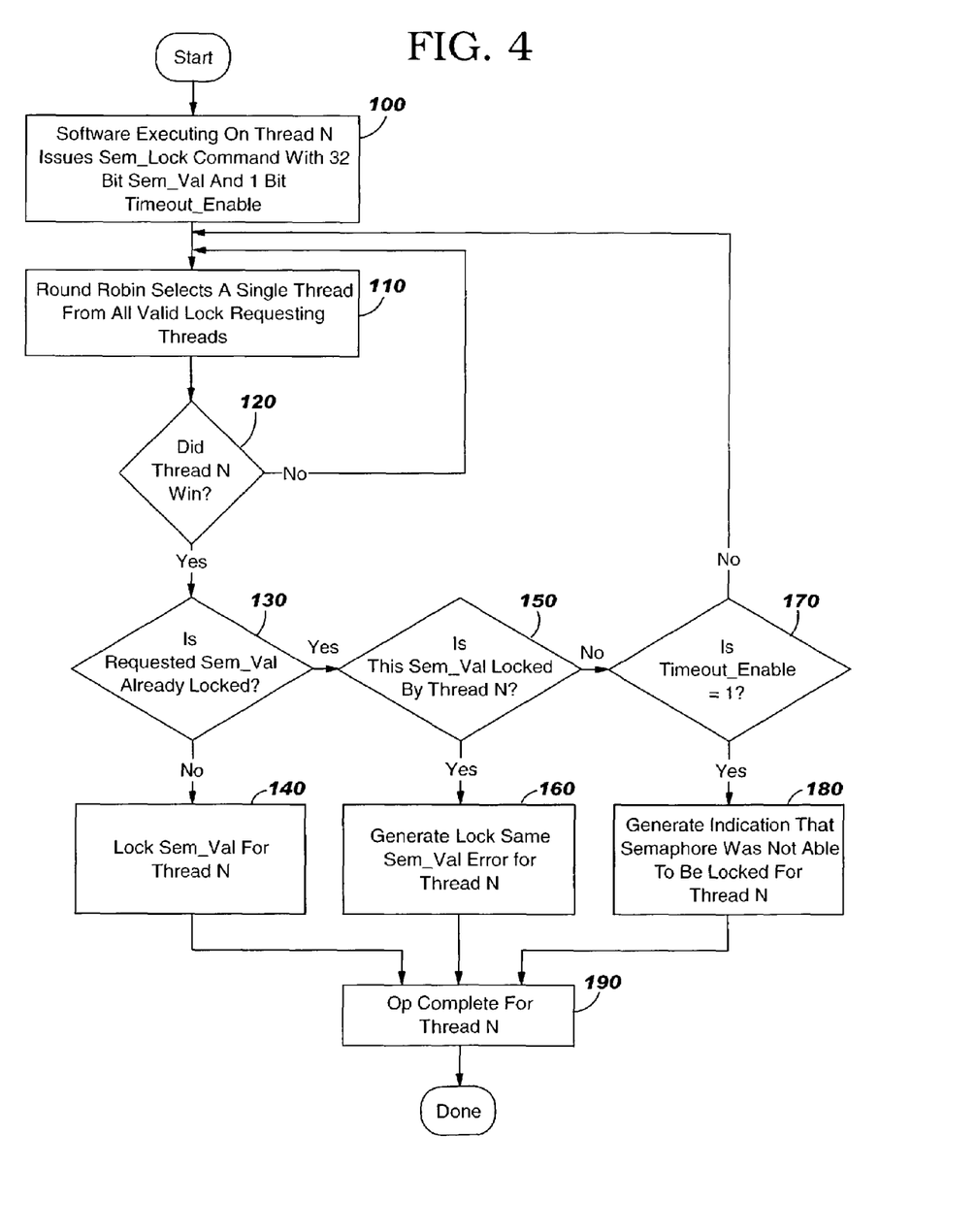
FIG. 4 is a flow diagram of the semaphore lock command logic illustrated in FIG. 2.

FIG. 4 illustrates the logic flow of the Semaphore Lock command. At block 100, the software executing on thread N issues a Semaphore Lock (Sem_Lock) command with two parameters, Semaphore Value (Sem_Val), a 32 bit value, and Timeout Enable (Timeout_Enable), a 1 bit value. Block 110 is a fair round-robin function which selects one Semaphore Lock command to service. This function selects one thread of all threads which could all issue a Semaphore Lock command at the same time. Block 120 is a test to see if a Semaphore Lock command from a given thread won the round-robin selection. If the Semaphore Lock command did not win the round-robin selection, it is returned to block 110 (the round-robin function) until it does win.

If the Semaphore Lock command does win the round-robin selection, the logic flow continues to block 130. At block 130, the Semaphore Value (Sem_Val) parameter received with the Semaphore lock command is checked to determine if this 32 bit value (Sem_Val) is already locked. This is accomplished by comparing the Sem_Val to the contents of the Semaphore_Value registers in FIG. 3 which have their associated Semaphore Lock register set to '1'b. If the Sem_Val is not already locked, then Sem_Val is locked for thread N at block 140, and signals the requesting thread that the Semaphore Lock command is complete (without any errors) at block 190. To lock Sem_Val, Sem_Val is written into the Semaphore_Value register associated with thread N and the Semaphore_Lock register associated with thread N is set to '1'b.

If the Sem_Val is locked, block 150 checks if the Sem_Val is already locked by thread N, the same thread which is requesting to lock it again. If thread N is attempting to lock the Sem_Val for which it has already locked, block 160 will generate an error signal to the software program on thread N at block 160 and signals the Semaphore Lock command is complete at block 190.

If the Sem_Val is locked (go to block 150) and it is not locked by thread N, the thread requesting the Sem_Val to be locked, control is passed to block 170. At block 170, the Timeout_Enable parameter is checked. If the Timeout_Enable parameter is not set (logic '0'b), this Sem_Lock command is returned to the round-robin selection algorithm, block 110. This allows the Sem_Val command to eventually lock the Sem_Val once it becomes unlocked. If the Timeout_Enable parameter is set (logic '1'b) at block 170, block 180 will signal the software program that the Sem_Val was not able to be locked for thread N. The Semaphore Lock command is complete at block 190.

Figure 5:
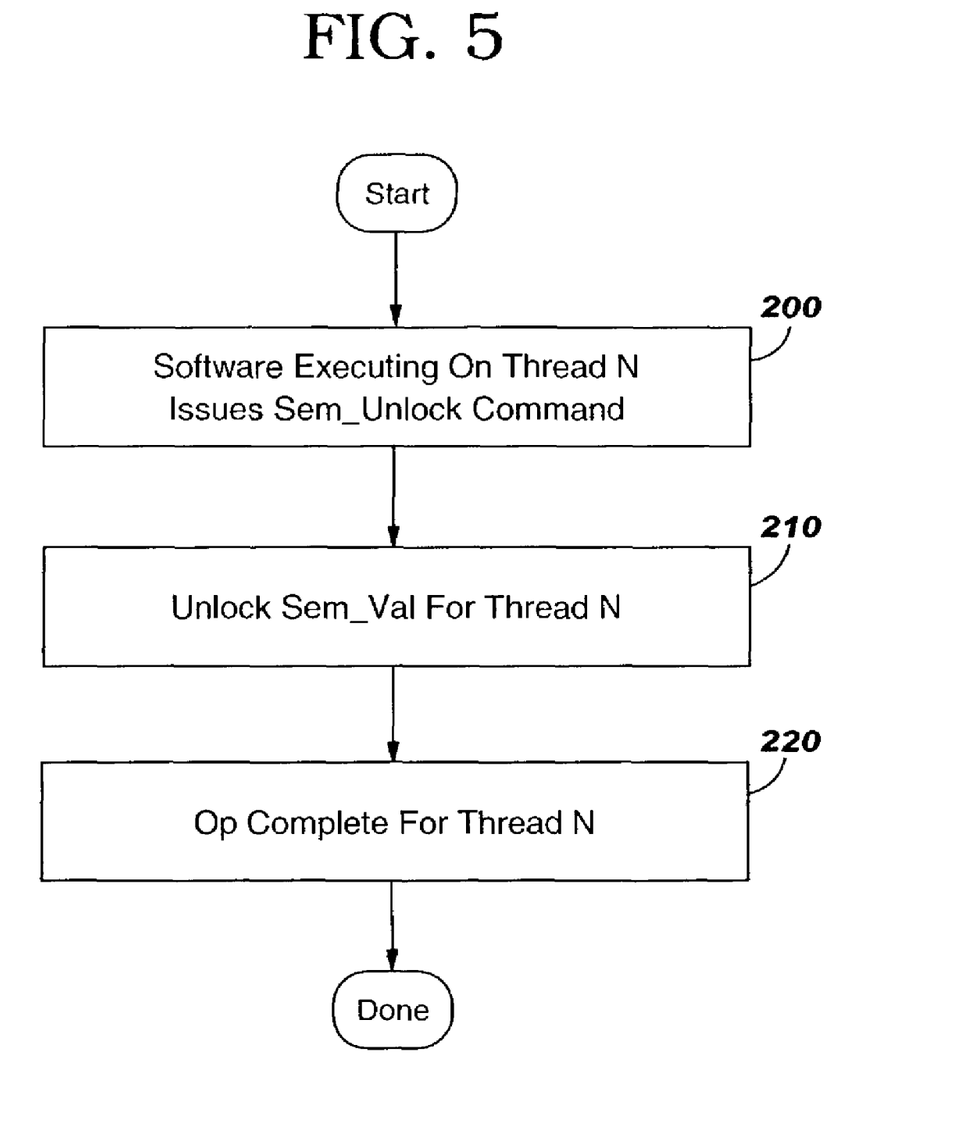
FIG. 5 is flow diagram of the semaphore unlock command logic of FIG. 2: and, FIG. 6 is a flow diagram of the error detection and exit logic illustrated in FIG. 2.
Figure 6:
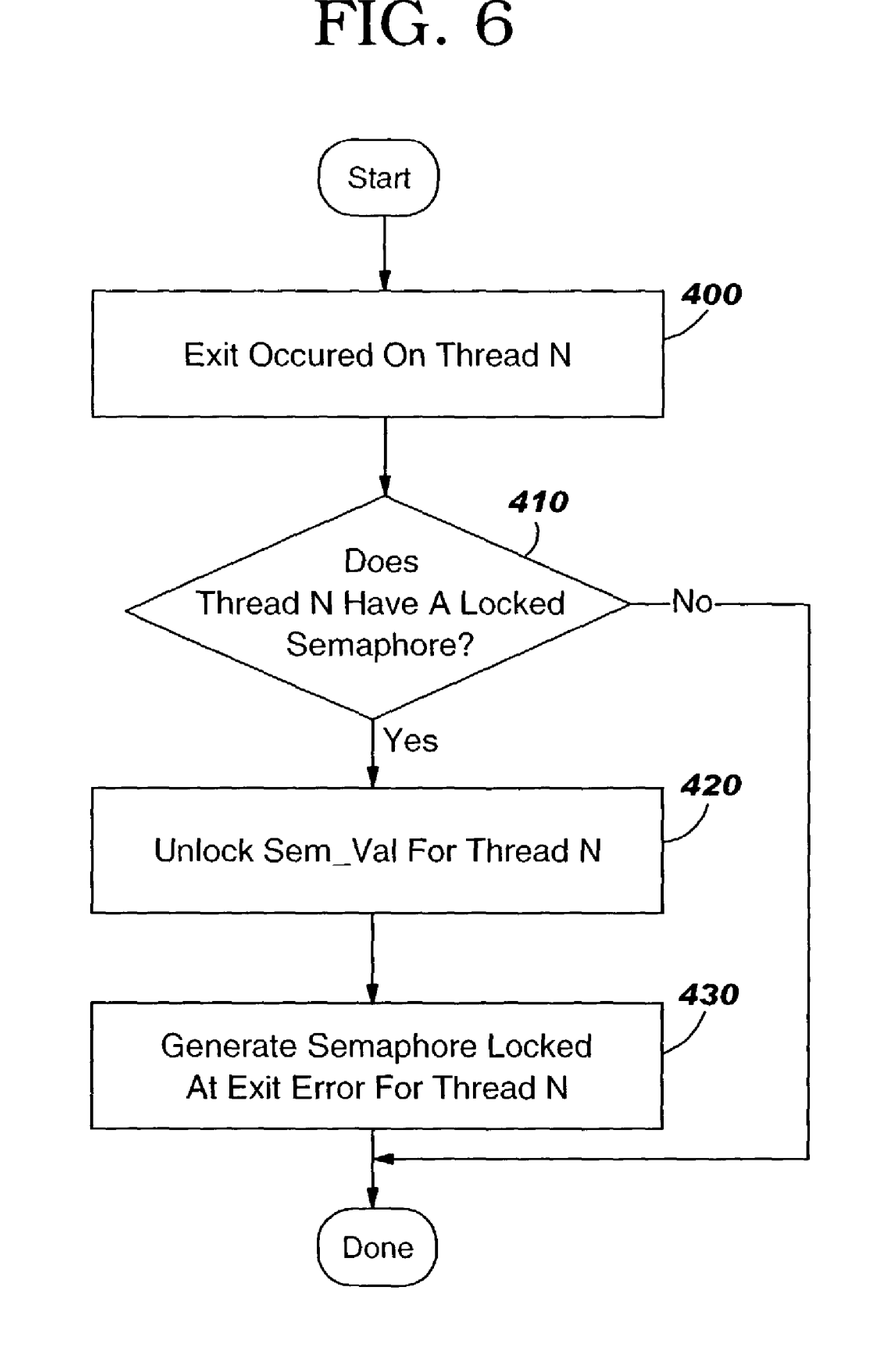

FIG. 5 illustrates the logic flow of the Semaphore Unlock command. At block 200, the software on thread N issues a Semaphore Unlock (Sem_Unlock) command with no parameters. At block 210, the Semaphore Value (Sem_Val) associated with thread N is unlocked. This is accomplished by resetting the Semaphore_Lock register to '0'b associated with thread N. The Semaphore Unlock command is complete at block 220.

FIG. 6 illustrates the logic flow, for the Semaphore Co-processor/Manager, when processing completes for a frame and the thread exits. In normal operation, a thread will unlock it's semaphore using the Sem_Unlock command before processing of the frame is complete. If a semaphore is locked when a thread exits (software has completed processing a frame), an error has occurred. The Semaphore Co-processor/Manager will detect and report this error. When software is done processing a frame, the last command executed is the Exit (Exit) command. At block 400, the Semaphore Co-processor/Manager detects the Exit command has been executed. At block 410, the Semaphore_Lock register is tested for the thread which just executed the Exit command. If the Semaphore_Lock register is '0'b, the thread does not have a locked semaphore and no error is reported.

If the Semaphore_Lock register is '1'b, the thread has a locked semaphore. At block 420, the Semaphore_Lock register is cleared to '0'b. At block 430, a "Semaphore Locked at Exit" error is generated.

The foregoing is illustrative of the present invention and is not to be construed as limiting the invention. While several embodiments of this invention have been described in detail, those skilled in this art will readily appreciate that many modifications are possible without materially departing from the novel teachings and advantages of this invention. Accordingly, all such modifications are intended to be included within the scope of this invention as defined by the claims. In the claims, means-plus-function clauses are intended to cover the structures described herein as performing the recited function and structural functional equivalents thereof. Therefore, it is to be understood that the foregoing is illustrative of the present invention and is not to be construed as limited to the specific embodiments disclosed, and that modifications to the disclosed embodiments, as well as other embodiments, are intended to be included within the scope of the claims appended hereto.

We claim:

1. A subsystem for managing semaphores for a multi-threaded processing system comprising:
    a memory having a plurality of storage areas;
    each of the storage areas including a first part for storing at least one first indicia for identifying at least one unique semaphore from a plurality of semaphores utilized by the multi-threaded processing system and a second part for storing a second indicia for indicating a locked status for a semaphore identified by the stored first indicia;
    first logic circuit responsive to a semaphore lock request from a thread for examining the contents of all of the storage areas to determine if a locked semaphore corresponding to a requested semaphore is stored in any of the storage areas;
    second logic circuit responsive to the first logic circuit for storing the requested semaphore in a storage area along with a locked status if the requested semaphore is not found in the search and notifying the requesting thread that the request is granted;
    third logic circuit responsive to the first logic circuit for rejecting the request if the requested semaphore is found in the memory and is locked by the requesting thread;
    fourth logic circuit responsive to the first and third logic circuits for holding the semaphore request in abeyance if the requested semaphore is found locked in the memory but is not locked by the requesting thread, the fourth logic circuit completing the semaphore lock request with an indication that no semaphore was locked if the request includes a set time out enable bit.

2. The subsystem set forth in claims 1 including:
    fifth logic circuit responsive to an unlock request from a thread for accessing a memory location associated with the thread for changing the status of a stored semaphore from locked to unlocked.

3. The subsystem set forth in claim 2 including:
    sixth logic circuit responsive to an exit signal from a thread for examining the storage location associated with the thread providing the exit signal to determine if the semaphore is unlocked and for unlocking the semaphore if it is locked and generating a semaphore locked at exit error message.

4. The subsystem set forth in claim 1 in which the memory is a content addressable memory and the contents are searched for thread identifying indicia.

5. The subsystem set forth in claim 1 in which the memory has a different location associated with each thread and thread identifying indicia is used to address that location.

6. A subsystem for managing semaphores for a multi-threaded processing system which processes a plurality of threads comprising:
    a memory having a plurality of storage areas one for each of the threads in the multi-threaded processing system, each of the storage areas including a first part for storing at least one first indicia for identifying at least one unique semaphore from a plurality of semaphores utilized by the multi-threaded processing system and a second part for storing a second indicia for indicating a locked status for a semaphore identified by the stored first indicia;
    first logic circuit responsive to a request for a semaphore from a thread for examining the contents of all of the storage areas to determine if a locked semaphore corresponding to the requested semaphore is stored in any of the storage areas;
    second logic circuit for storing the requested semaphore in the storage area associated with the requesting thread along with a status indicating a locked semaphore if the requested semaphore is not found in the search and notifying the requesting thread that the request is granted;

third logic circuit for rejecting the request if the requested semaphore is found in the memory associated with the requesting thread; and fourth logic circuit for holding the semaphore request in abeyance if the requested semaphore is found in a memory not associated with the requesting thread, the fourth logic circuit completing the semaphore lock request with an indication that no semaphore was locked if the request includes a set time out enable bit.

7. The subsystem set forth in claim 6 including:

fifth logic circuit responsive to an unlock signal from a thread for accessing a memory location associated with the thread for changing the status of a stored semaphore from locked to unlocked.

8. The subsystem set forth in claim 7 including:

sixth logic circuit responsive to an exit signal from a thread for examining the storage location associated with the thread providing the exit signal to determine if the semaphore is unlocked and for unlocking the semaphore if it is locked and generating a semaphore locked at exit error message.

9. In a multi-threaded processing system a method for managing semaphores comprising the following steps:

establishing a memory having a plurality of storage areas each of which includes a first part for storing at least one first indicia for identifying at least one unique semaphore from a plurality of semaphores utilized by the multi-threaded processing system and a second part for storing a second indicia for indicating a locked status for a semaphore identified by the stored first indicia;

receiving a semaphore lock request from a thread, examining the contents of all of the storage areas to determine if a semaphore corresponding to a requested semaphore is stored in locked status in any of the storage areas;

if a semaphore in locked status corresponding to the requested semaphore is not found, storing the requested semaphore in a storage area along with a locked status indicia and notifying the requesting thread that the request is granted;

rejecting the request if the requested semaphore is found in the memory and is locked by the requesting thread;

holding the semaphore request in abeyance if the requested semaphore is found in the memory but is not locked by the requesting thread; and completing the semaphore lock request with an indication that no semaphore was locked if the request includes a set time out enable bit.

10. The method set forth in claims 9 in which:

in response to an unlock signal from a thread, changing the status of a stored semaphore from locked to unlocked in the storage location associated with the thread.

11. The method set forth in claim 10 including:

examining, in response to an exit signal from a thread the storage location associated with the thread providing the exit signal, to determine if the semaphore is unlocked, and unlocking the semaphore if it is locked and generating a semaphore locked at exit error message.

12. In a multi-threaded processing system which processes a plurality of threads, a method for managing semaphores comprising the following steps:

establishing a memory having a storage area for each of the threads each of which includes a first part for storing at least one first indicia for identifying at least one unique semaphore from a plurality of semaphores utilized by the multi-threaded processing system and a second part for storing a second indicia for indicating a locked status for a semaphore identified by the stored first indicia;

receiving a semaphore lock request from a thread, examining the contents of all of the storage areas to determine if a semaphore corresponding to a requested semaphore is stored in locked status in any of the storage areas;

if a semaphore in locked status corresponding to the requested semaphore is not found, storing the requested semaphore in a predetermined storage area along with a locked status indicia and notifying the requesting thread that the request is granted;

rejecting the request if the requested semaphore is found in the memory and is locked by the requesting thread;

holding the semaphore request in abeyance if the requested semaphore is found in the memory but is not locked by the requesting thread; and completing the semaphore lock request with an indication that no semaphore was locked if the request includes a set time out enable bit.

13. The method set forth in claim 12 in which:

in response to an unlock signal from a thread, changing the status of a stored semaphore from locked to unlocked in the storage location associated with the thread.

14. The method set forth in claim 13 including:

examining in response to an exit signal from a thread the storage location associated with the thread providing the exit signal to determine if the semaphore is unlocked and unlocking the semaphore if it is locked and generating a semaphore locked at exit error message.

* * * * *